No. 730,146. PATENTED JUNE 2, 1903.
G. C. NELSON.
VARIABLE SPEED MECHANISM.
APPLICATION FILED NOV. 6, 1902.
NO MODEL. 3 SHEETS—SHEET 1.

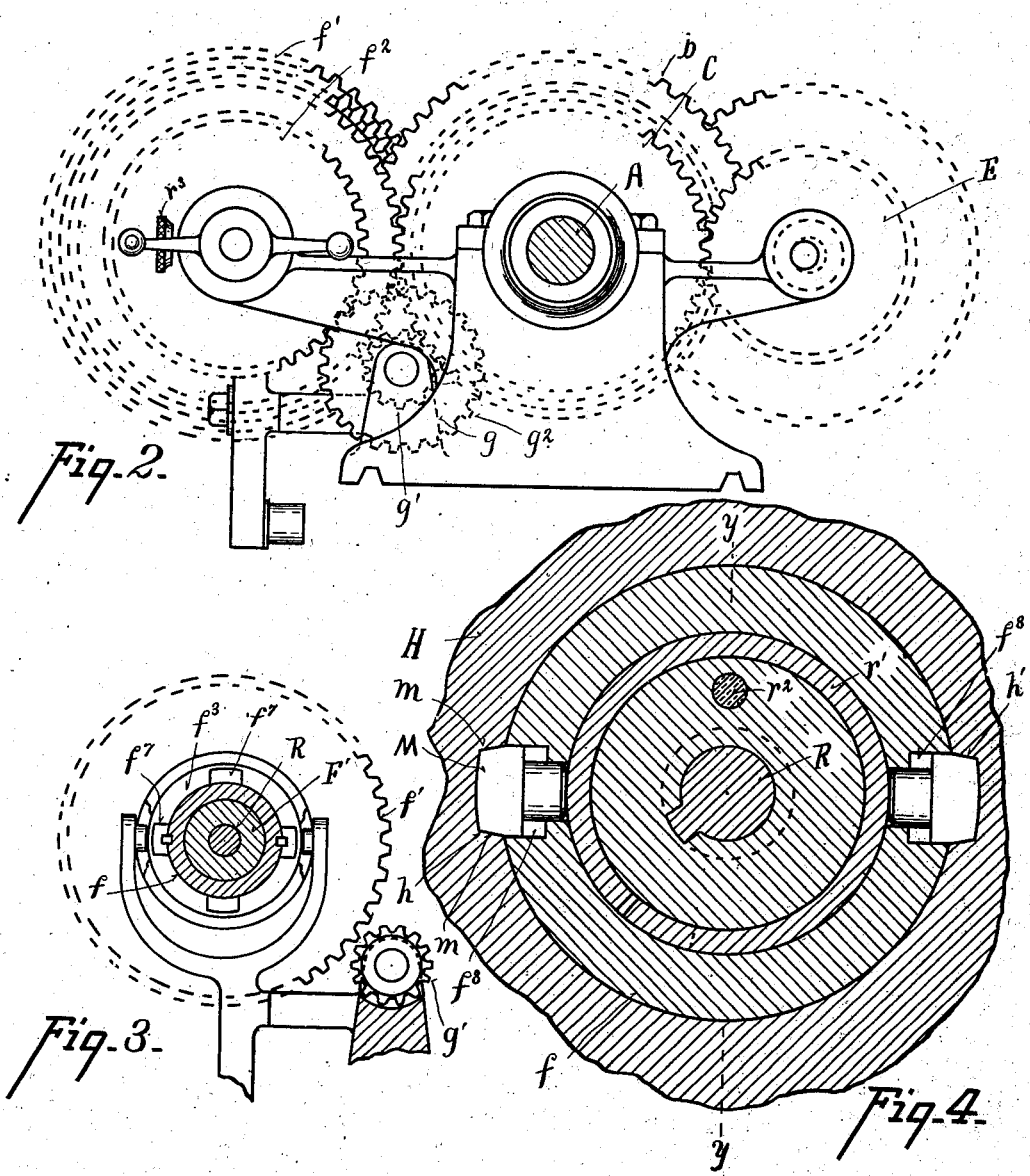

No. 730,146. PATENTED JUNE 2, 1903.
G. C. NELSON.
VARIABLE SPEED MECHANISM.
APPLICATION FILED NOV. 6, 1902.
NO MODEL. 3 SHEETS—SHEET 3.

Witnesses
C. W. Miles
A. McCormack

Inventor
Geo. C. Nelson
By Murray & Murray
Attorneys

No. 730,146. Patented June 2, 1903.

UNITED STATES PATENT OFFICE.

GEORGE C. NELSON, OF MIDDLETOWN, OHIO.

VARIABLE-SPEED MECHANISM.

SPECIFICATION forming part of Letters Patent No. 730,146, dated June 2, 1903.

Application filed November 6, 1902. Serial No. 130,233. (No model.)

*To all whom it may concern:*

Be it known that I, GEORGE C. NELSON, a citizen of the United States of America, and a resident of Middletown, county of Butler, State of Ohio, have invented certain new and useful Improvements in Variable-Speed Mechanism, of which the following is a specification.

The object of my invention is a mechanism for varying the speed of the spindle in lathes, shapers, drill-presses, milling-machines, &c., without shifting the driving-belt, and likewise to change the direction of the rotation of the spindle. This object is attained by the means described in the specification, specifically pointed out in the claims, and illustrated in the accompanying drawings, in which—

Figure 1:
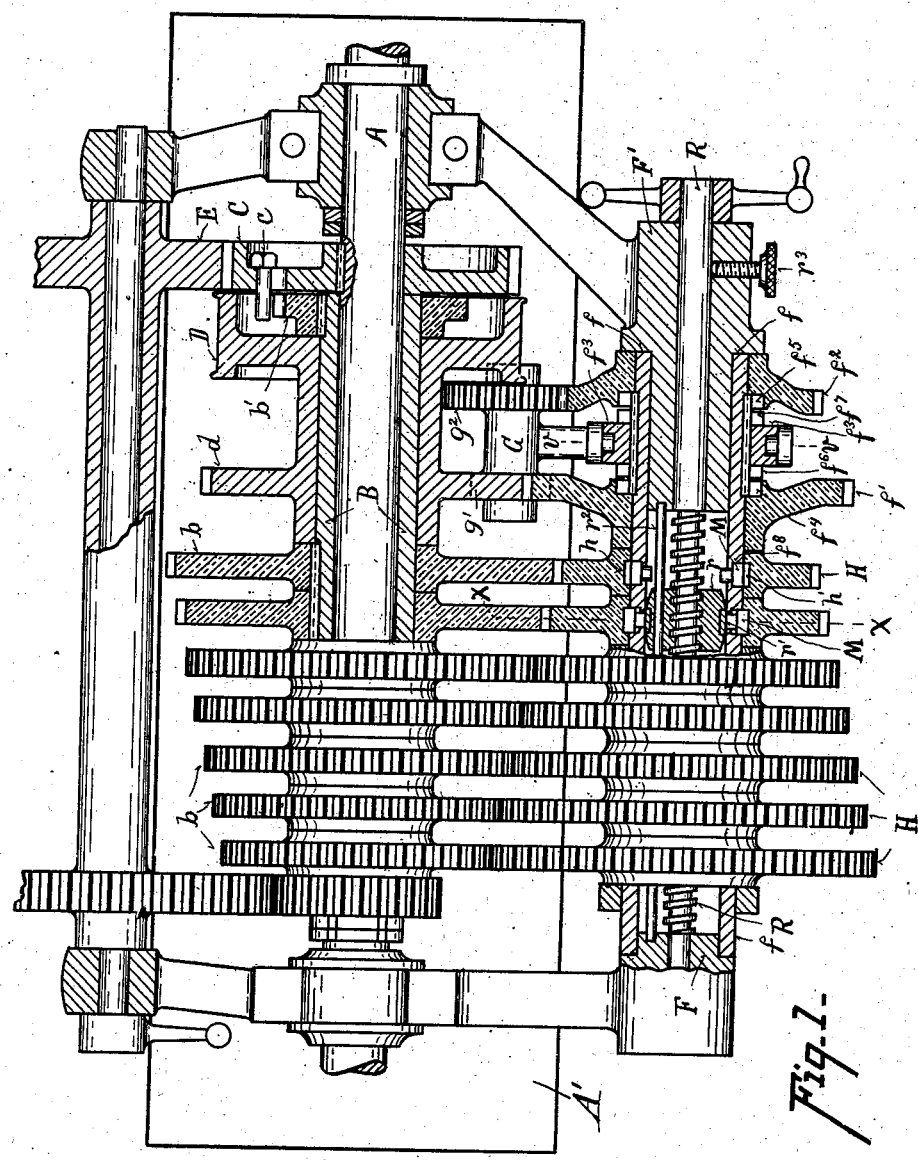
Figure 5:
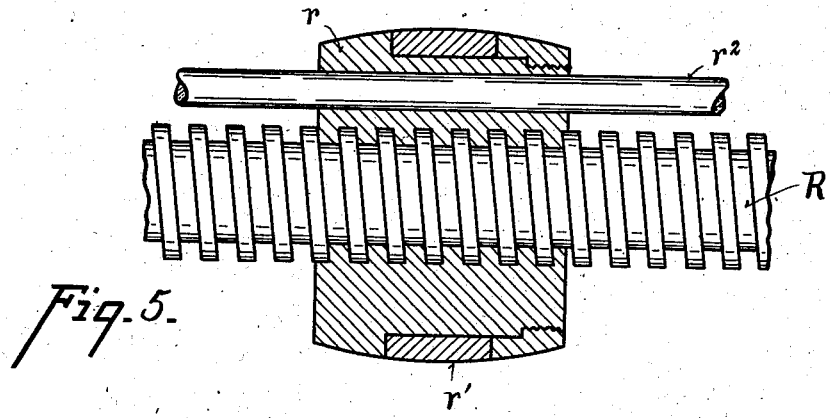
Figure 6:
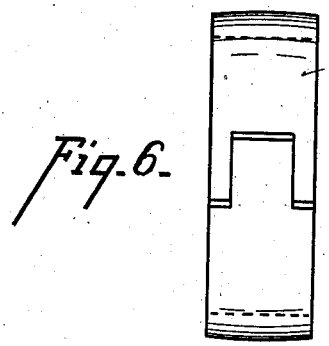
Figure 7:
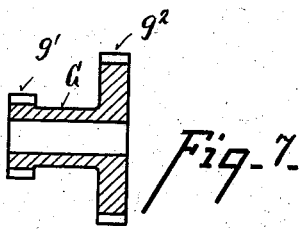
Figure 8:
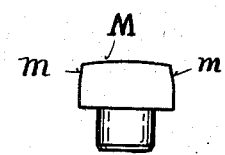
Figure 9:
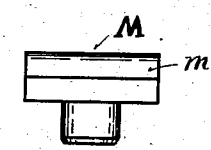

Figure 1 is a top plan view, partly in horizontal section, of a head-stock showing a spindle supplied with the variable-speed mechanism embodying my invention. Fig. 2 is an end view of the same. Fig. 3 is a detail vertical sectional view taken upon line $v\ v$ of Fig. 1. Fig. 4 is an enlarged vertical sectional view taken upon line $x\ x$ of Fig. 1. Fig. 5 is a horizontal detail sectional view taken upon line $y\ y$ of Fig. 4. Fig. 6 is a detail elevation of the spring-ring for locking the keys in the seats of the gear-wheels mounted on the shaft adjacent to the spindle. Fig. 7 is a central sectional detail view of the intermediate gearing for coupling the pulley and the shaft and the gears upon the shaft. Figs. 8 and 9 are detail elevations of the key.

Referring to the parts, live-spindle A, mounted in the head-stock A' in the usual manner, has mounted upon it a sleeve B and secured to it a gear-wheel C. Upon bushing or sleeve B are secured a series of varying-sized gear-wheels $b$, and rotatably mounted upon it is a pulley D, formed integral with which is a gear-wheel $d$. Secured to the bushing B, adjacent to gear-wheel C, is a pinion $b'$, which may be coupled or uncoupled from gear-wheel C by the shifting of a pin $c$ in the gear-wheel C. When the pin $c$ couples pinion $b'$ and gear-wheel C, bushing B and spindle A have the same rate of rotation. When it is desired to throw in the back-gear E, pin $c$ is disengaged from pinion $b'$ and the rate of rotation of the bushing and the spindle are varied through the back-gear.

The means for transmitting the motion of the pulley D to the bushing B and for varying the rates of the rotation of the bushing and for changing the direction of the rotation of the bushing without changing either the direction or the rate of the speed of the pulley will now be described.

Formed integral with the head-stock A' and in axial alinement with spindle A are two journal-bearings F and F', between which the bushing $f$ is rotatably mounted. Upon bushing $f$ a gear-wheel $f'$, which meshes with gear-wheel $d$, and at a short distance from gear-wheel $f'$ a second gear-wheel $f^2$ are rotatably mounted. Between gear-wheels $f'$ and $f^2$ a sliding clutch $f^3$ is feathered upon bushing $f$. Gear-wheels $f'$ and $f^2$ have jaws $f^4$ and $f^5$, which may be engaged with jaws $f^6$ and $f^7$ of the clutch by sliding it in one direction or the other. Gear-wheel $f^2$ is placed in gear with gear-wheel $d$ by means of an intermediate short shaft G, which is journaled in a standard $g$, projecting upward from the head-stock. Shaft G carries pinions $g'$ and $g^2$. Pinion $g'$ meshes with gear-wheel $d$ and pinion $g^2$ meshes with gear-wheel $f^2$, so that the direction of rotation of the gear-wheel $f^2$ is in a reverse direction from that of gear-wheel $f'$, and to reverse the direction of the rotation of bushing $f$ it is necessary only to shift clutch $f^3$ in one direction or the other to couple it with gear-wheel $f'$ or gear-wheel $f^2$.

Loosely mounted upon bushing $f$ and meshing with the series of gear-wheels $b$ upon bushing B are a series of gear-wheels H, which are of gradually-increasing size. Each of gear-wheels H has key-seats $h$ and $h'$ formed in it at diametrically opposite points. Registering with key-seats $h$ and $h'$ a series of key-seats $f^8$ are formed in the bushing $f$. Seated in these key-seats are a series of keys M, which project inward to the interior of bushing $f$. Keys M have beveled edges $m$ upon each side that contact the key-seats $h$ and $h'$, so that when not held outward by a positive force they are pushed inward by gear-wheels H in their rotation by the edge of the key-seats $h$ and $h'$ contacting the beveled edge $m$. The means by which any one of gear-wheels H may have its corresponding key M pushed into its key-seat to secure it to bushing $f$ is as follows:

Within bushing $f$ and journaled in journal-bearings F and F' is a longitudinal feed-screw R, upon which is a slide $r$, which carries a spring-ring $r'$. Slide $r$ has passing through it a guide-rod $r^2$, which is secured between journal-bearings F and F' in a position parallel to the feed-screw R. By rotating feed-screw R in one direction or the other the slide $r$ may be reciprocated in either direction, so as to bring the spring-ring $r'$ into contact with any one of the keys M. When the spring-ring $r'$ is brought in a position to register with any one set of the keys M, it exercises an outward pressure upon the same and causes them to spring outward into the key-seats $h$ and $h'$ in the one of the gear-wheels H which it is desired to have secured to bushing $f$. When this position of the spring-ring has been reached, feed-screw R may be held against rotation by means of a set-screw $r^3$ in the journal-bearing F'.

In operation, supposing the back-gear to have been thrown out of mesh and pinion $b'$ to be coupled to gear-wheel C and clutch $f^3$ to have been coupled to gear $f'$, the rate of rotation of spindle A may be varied as desired by simply rotating feed-screw R to bring the spring-ring $r'$ into contact with the key which registers with the gear-wheel of the series H, which gives the desired rotation. If it be desired to again change the speed of the spindle A, the feed-screw R may be rotated so as to loosen the gear-wheel of the series H, just secured upon bushing $f$, and to secure another one of the gear-wheels H upon the bushing. Thus by the simple rotation of the feed-screw R without any change in the driving-belt a variety of speeds of the spindle A equal to the number of the gear-wheels H may be secured. By disengaging pin $c$ from pinion $c'$ and by throwing in the back-gear another series of variations in speed different from the variety just mentioned may be secured by the rotation of feed-screw R. To change the direction of the rotation of the spindle, clutch $f^3$ has simply to be shifted so as to engage gear-wheel $f^2$. With the clutch in this position a variety of speeds of spindle A in a reverse direction may be secured—as great in number as the variety just described.

What I claim is—

1. The combination of a spindle, a bushing mounted rotatably upon the spindle, a gear-wheel fixed upon the spindle, a series of varying-sized gear-wheels secured upon the bushing, a shaft journaled adjacent to the spindle, shift mechanism mounted upon the shaft to couple one of the gear-wheels of the bushing with the shaft, means for imparting rotation to the shaft, means for coupling and uncoupling the fixed gear-wheel on the spindle and the bushing together, back-gear to be thrown into mesh with a gear on the bushing and the gear-wheel on the spindle, when the gear-wheel on the spindle is uncoupled from the bushing, substantially as shown and described.

2. The combination of a spindle, a series of gear-wheels varying in size secured upon the spindle, a driving-pulley rotatably mounted upon the spindle, a shaft journaled adjacent to the spindle, means for coupling the shaft and the pulley, a series of gear-wheels varying in size mounted rotatably upon the shaft and meshing with the gear-wheels on the spindle, and means for locking any one of the second series of wheels upon the shaft, substantially as shown and described.

3. The combination of a spindle, a bushing mounted rotatably upon the spindle, a gear-wheel fixed upon the spindle, a series of varying-sized gear-wheels secured upon the bushing, a shaft journaled adjacent to the spindle, a second series of varying-sized gear-wheels mounted rotatably upon the shaft and meshing with the first series of varying-sized gear-wheels, means for imparting rotation to the shaft, means for coupling and uncoupling the fixed gear-wheel on the spindle and the bushing on the spindle together, back-gear to be thrown into gear with a gear on the bushing and the gear-wheel on the spindle, when the gear-wheel on the spindle is uncoupled from the bushing, substantially as shown and described.

4. The combination of a spindle, a series of varying-sized gear-wheels secured upon the spindle, a supplemental shaft journaled adjacent to the spindle, a series of gear-wheels varying in size mounted rotatably upon the shaft and meshing with the gear-wheels on the spindle, a feed-screw carried by the shaft, and a reciprocating slide actuated by the feed-screw for engaging the gear-wheels and securing one of them upon the supplemental shaft, substantially as shown and described.

5. The combination of a spindle, a series of varying-sized gear-wheels secured upon the spindle, a pulley mounted rotatably upon the spindle, a gear-wheel secured to the pulley, a shaft journaled adjacent to the spindle, two gear-wheels mounted loosely upon the shaft, one of the gear-wheels in mesh with the gear-wheel of the pulley, an intermediate shaft carrying two gear-wheels, the two gear-wheels one in mesh with the gear-wheel on the pulley and the other in mesh with the second gear-wheel on the shaft, a sliding clutch feathered upon the shaft for engaging either one of the loose gear-wheels on the shaft, a series of varying-sized gear-wheels mounted loosely upon the shaft and meshing with the series of similar gear-wheels upon the spindle, and means for locking any one of the second series of varying-sized gear-wheels upon the shaft, substantially as shown and described.

GEO. C. NELSON.

Witnesses:
W. F. MURRAY,
A. McCUMACK.